(12) United States Patent
Mateer

(10) Patent No.: US 9,609,974 B2
(45) Date of Patent: Apr. 4, 2017

(54) HANG-IT-ALL CURTAIN SYSTEM

(71) Applicant: Shelley Megan Mateer, Columbus, OH (US)

(72) Inventor: Shelley Megan Mateer, Columbus, OH (US)

(73) Assignee: Shelley Megan Mateer, Columbus, OH (US)

( * ) Notice: Subject to any disclaimer, the term of this patent is extended or adjusted under 35 U.S.C. 154(b) by 0 days.

(21) Appl. No.: 14/628,237

(22) Filed: Feb. 21, 2015

(65) Prior Publication Data

US 2016/0242586 A1    Aug. 25, 2016

(51) Int. Cl.
| | |
|---|---|
| *A47H 1/10* | (2006.01) |
| *A47H 1/102* | (2006.01) |
| *F16B 2/24* | (2006.01) |
| *A47H 1/022* | (2006.01) |
| *A47H 1/142* | (2006.01) |
| *A47H 1/16* | (2006.01) |
| *A47B 96/06* | (2006.01) |
| *A47G 29/00* | (2006.01) |
| *A47K 1/00* | (2006.01) |
| *E04G 3/00* | (2006.01) |
| *E04G 5/06* | (2006.01) |
| *F21V 21/00* | (2006.01) |
| *F21V 35/00* | (2006.01) |
| *A47H 1/14* | (2006.01) |
| *A47H 1/02* | (2006.01) |

(Continued)

(52) U.S. Cl.
CPC ............. *A47H 1/102* (2013.01); *A47H 1/022* (2013.01); *A47H 1/142* (2013.01); *A47H 1/16* (2013.01); *F16B 2/248* (2013.01); *A47H 1/00* (2013.01); *A47H 1/12* (2013.01); *A47H 1/14* (2013.01); *A47H 2001/003* (2013.01); *A47H 2001/021* (2013.01)

(58) Field of Classification Search
CPC ........ A47H 1/142; A47H 1/102; A47H 1/022; A47H 1/122; A47H 1/14; A47H 1/13; A47H 2001/006; A47H 1/18; A47H 1/00; A47H 2001/003; A47H 1/10; A47H 1/12; A47H 1/16
USPC ....... 248/214, 251, 261, 262, 263, 264, 265; 24/546, 598.5, 598.6
See application file for complete search history.

(56) References Cited

U.S. PATENT DOCUMENTS 675,761 A * 6/1901 Vaaler ............................ 24/546
1,458,232 A * 6/1923 Maienschein ................ 248/254

(Continued)

*Primary Examiner* — Brian Mattei
*Assistant Examiner* — Taylor Morris

(57) ABSTRACT

An improved, simpler, and more cost effective method for hanging multiple layers of curtaining with reduced damage to the casement of a window or of the walls around a window. An e-shaped hook (1) wraps around an existing bracket (3) utilized to hang a primary curtain rod. The hook (1) then extends down from the bracket (3) ending in a lateral prong at a right angle to the bracket (3) and perpendicular to the original curtain rod, pointing toward the center of the window. This prong is then inserted into the aperture of a telescoping rod with an internal spring adjustment referred to as a spring tension rod (2). The spring tension rod (2), due to its internal spring, allows for the rod to be inserted onto the hook (1) and be released from the hook (1) without the removal of the hook (1) from the bracket (3).

7 Claims, 3 Drawing Sheets

(51) Int. Cl.
*A47H 1/12* (2006.01)
*A47H 1/00* (2006.01)

(56) References Cited

U.S. PATENT DOCUMENTS

| | | | | |
|---|---|---|---|---|
| 1,799,558 | A * | 4/1931 | Howard | 248/213.4 |
| 1,858,950 | A * | 5/1932 | Carlson | 211/105.5 |
| 1,875,150 | A * | 8/1932 | Reinhardt | A47H 1/142 |
| | | | | 211/105.2 |
| 2,012,482 | A * | 8/1935 | Russell | 248/254 |
| 2,233,430 | A * | 3/1941 | Ratcliffe | A47H 1/13 |
| | | | | 248/254 |
| 2,293,662 | A * | 8/1942 | Richardson | A47H 1/122 |
| | | | | 160/19 |
| 2,455,576 | A * | 12/1948 | Fiorentino | A47H 1/16 |
| | | | | 211/105.3 |
| 3,946,978 | A * | 3/1976 | Evans | 248/264 |
| 4,202,074 | A * | 5/1980 | Hard Af Segerstad | 16/94 D |
| 4,627,132 | A * | 12/1986 | Markham | 24/169 |
| 6,719,156 | B2 * | 4/2004 | Ellbogen et al. | 211/105.1 |
| 7,287,734 | B2 * | 10/2007 | Bell | 248/262 |

\* cited by examiner

HANG-IT-ALL CURTAIN SYSTEM

BACKGROUND

Prior Art

The following is a tabulation of some prior art that presently appears relevant:

| U.S. Patents | | | |
| --- | --- | --- | --- |
| Patent Number | Kind Code | Issue Date | Patentee |
| 7648111 | B2 | Jan. 19, 2010 | Goldstein |
| 6719156 | B2 | Apr. 13, 2004 | Ellbogen |

BACKGROUND OF THE INVENTION

This invention is a method and objects to add supplemental curtain rods to an existing main curtain rod and bracket. With this invention multiple layers of curtaining can decorate a window allowing these layers to be easily removed and replaced causing no further damage to the window casing or walls beyond that of the original main curtain bracketing.

In decorating a window, it is standard in the art to have brackets attached to the casing or walls, usually by the use of screws, which support a rod for hanging drapery. For larger windows additional support brackets are used. To enable the hanging of additional layers of window dressing such as a valance, jabots, and/or sheers, more rods with smaller brackets nested between the main brackets are typically used. These can be cumbersome to install and awkward to manipulate for cleaning or replacing the curtains.

Prior art exists that attempts to address this issue. U.S. Pat. No. 6,719,156 B2, 2004, Ellbogen illustrates a clip and tongue device with the clip grasping a round primary bracket and an attached tongue located below a vertical centerline of said clip perpendicular to the round bracket which is then inserted into a supplemental rod with apertures at either end to receive the tongue. The rod is retained by frictional engagement with the tongue and the inner surface of the rod.

U.S. Pat. No. 7,648,111B2, 2010, by Goldstein illustrates prior art of an apparatus and method for hanging supplemental sets of curtains through the use of end fasteners attached to a main support bracket of an existing curtain rod. These fasteners enable the rod to be easily removable and adapt to either hollow or solid supplemental curtain rods. These fasteners function like c-clamps requiring a set screw to affix the fastener to a main support bracket.

Therefore, while there exists prior art allowing for multiple sets of curtain rods to be hung from an existing curtain rod bracket system causing no more damage to casement or walls, they do not create an ease of use without the dismantling of the methods described. Additionally, Ellbogen is limited to the use of a round mounting bracket while the clip and tongue configuration brings into question the ability of the tongue to adequately maintain the weight of the curtaining desired without eventually breaking off. Added to that, Goldstein's c-clamp fasteners and caps may be more stable, yet they add an undue complexity to the utilization of the method in adding supplemental curtaining.

SUMMARY OF THE INVENTION

The object of this invention is to create a supplemental rod system that address the issues presented by the prior art.

It is also the object of this invention to provide a system that allows for easily installing the supplemental rods on various bracket styles.

It is further the object of this invention to provide a system that allows for easily removing and replacing curtaining without dismantling the whole system In addition, the object of this system is to provide a secure method of hanging supplemental curtain rods.

It is yet another object of this invention to provide a system for large windows that require additional support with the ability of the same said hooks to be used in the same fashion on the additional supports pointing in opposite directions.

To this end, this invention provides e-shaped hooks made of a continuous wire with the ability to maintain its shape under standard curtaining weights, that slides onto an existing bracket. The configuration of the e-shaped hooks begins with the upper portion looping back on itself 180 degrees allowing it to be wrapped around the bracket, continuing with a downward arm running perpendicular to the upper portion which then returns at a right angle running parallel with the upper portion creating a prong. Onto the prongs of the hooks positioned on the brackets at either side of the window slide the apertures of a spring tension rod. The spring tension of the rod holds the rod onto the said prongs. The slight compression of the spring tension rod allows the rod to be released from the said prongs of the hooks allowing for easily removing and replacing the rod without the removal of the hooks from the primary bracket. By the utilization of the primary bracket for the hanging of the supplemental rods, no further damage is caused to the casement or walls. This system is a lower cost means of hanging multiple layers of curtaining and sold separate from the primary curtain rod.

DRAWINGS

Reference Numerals

1 E-shaped hook
2 Spring Tension Rod
3 End Bracket of Primary Rod
4 Center Bracket of Primary Rod

DETAILED DESCRIPTION OF THE PREFERRED EMBODIMENT

Figure 1A:
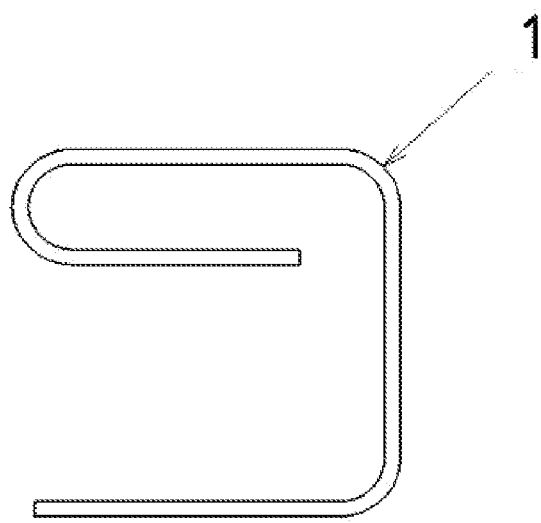
FIG. 1a is the side elevation of the e-shaped hook.
Figure 1B:
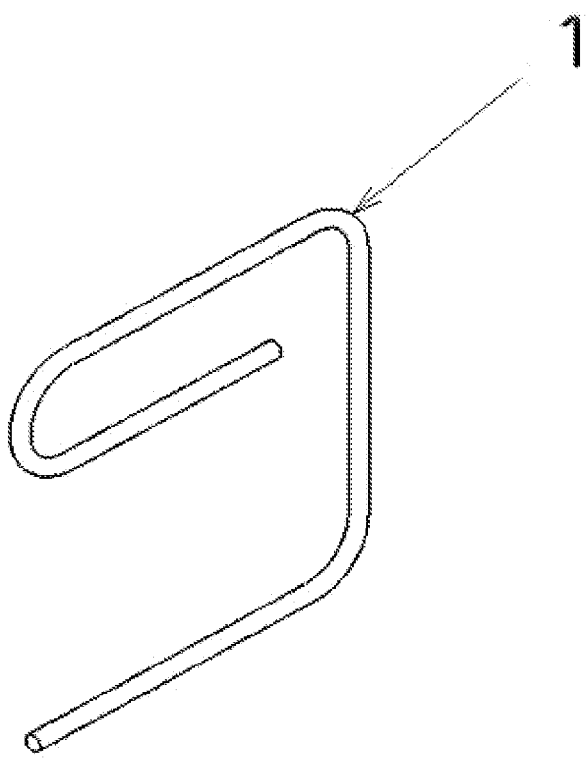
FIG. 1b is an oblique view of the e-shaped hook.

In reference to FIG. 1a and FIG. 1b, the e-shaped hook 1 is shown with the upper portion looping back on itself 180 degrees allowing it to be wrapped around the bracket continuing with a downward arm running perpendicular to the upper portion which then turns at a right angle running parallel with the upper portion creating a prong.

Figure 2A:
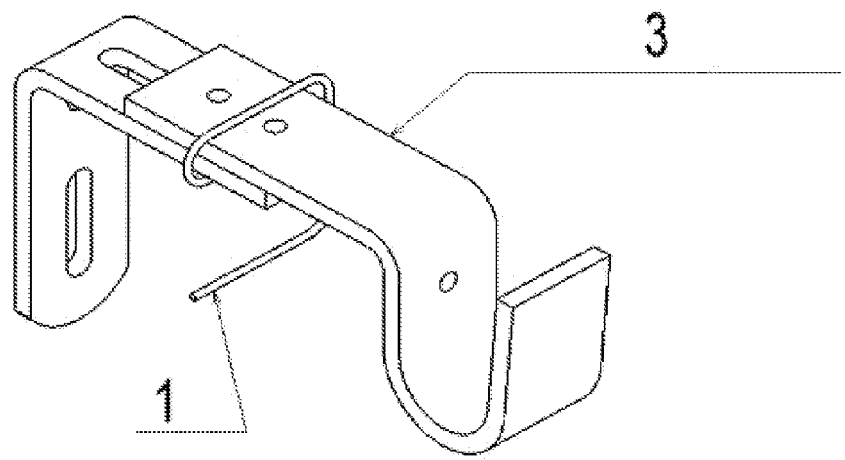
FIG. 2a is an inside perspective of the preferred embodiment in the primary stage.

FIG. 2a shows the bracket 3 is shown with the e-shaped hook 1 wrapping around said bracket 3.

Figure 2B:
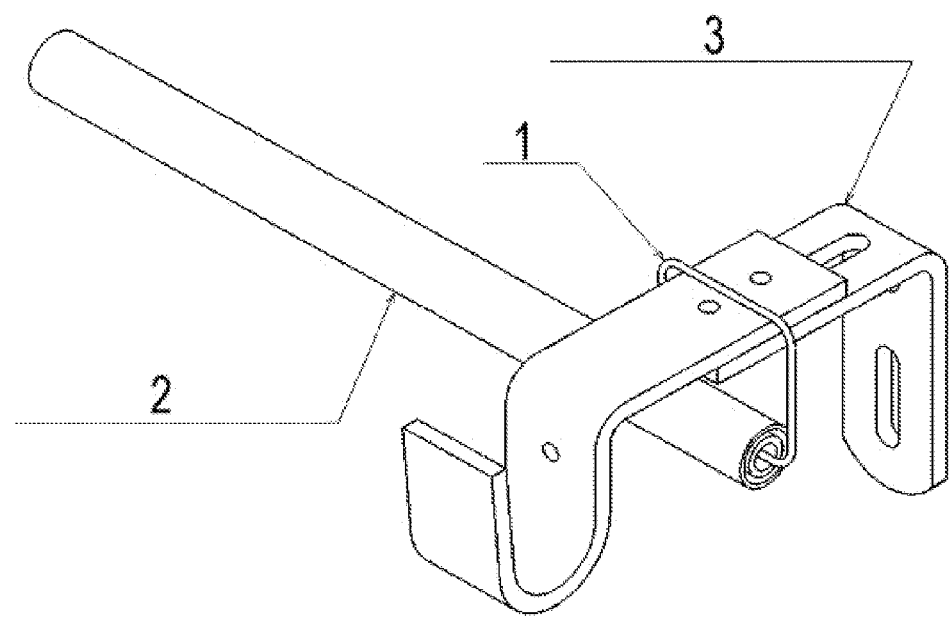
FIG. 2b is the outside perspective of the preferred embodiment of the final stage.

FIG. 2b shows an outside perspective of the primary curtain bracket 3 with the e-shaped hook 1 slid onto it and the prong inserted into the spring tension rod 2.

Figure 3A:
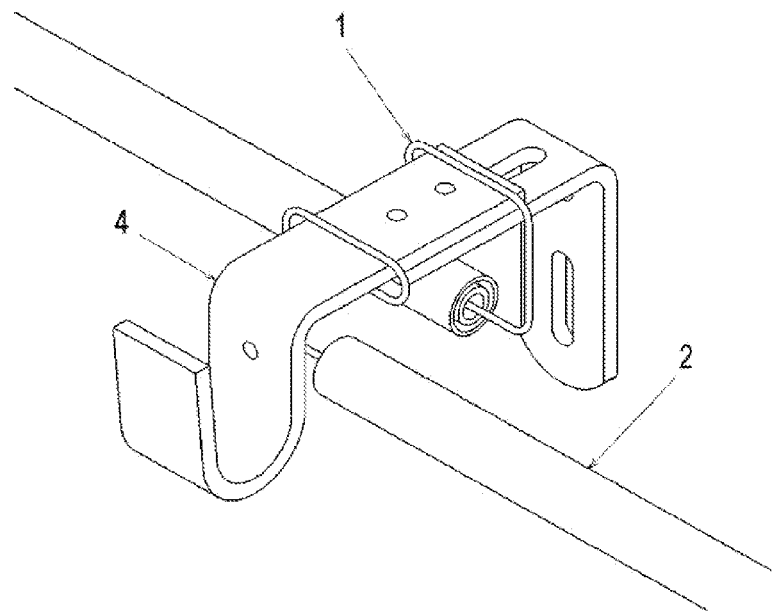
FIG. 3a is a right view variation of the preferred embodiment when a secondary support is needed.
Figure 3B:
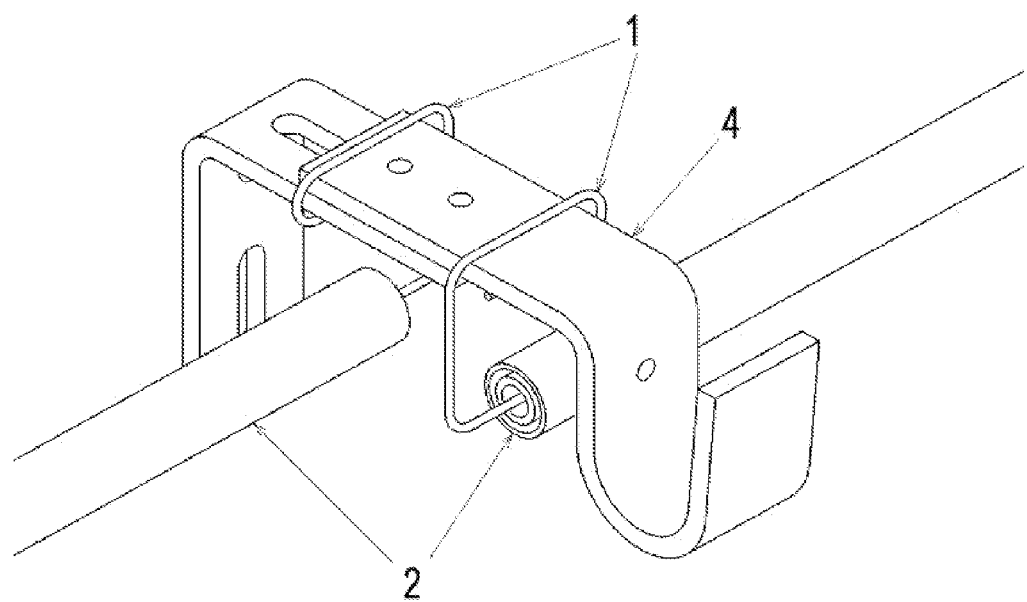
FIG. 3b is a left view variation of the preferred embodiment when a secondary support is needed.

FIG. 3a and FIG. 3b shows an oblique perspectives of a supplemental main curtain bracket 4 with two e-shaped hooks 1 inserted into two spring tension rods 2 from opposite directions.

OPERATION

FIG. 2a, 2b, 3

This system works in tandem with a previously hung rod that uses brackets to secure said rod to a window casement or wall. The e-shaped hook of the Hang-It-All Curtain System slides onto the brackets on either side of the window with the lower prong pointing in the direction of the center of the window as per FIG. 2a. The spring tension rod is adjusted as per the instructions on the use of said rod to the distance between the back side of the e-shaped hook. The spring tension rod is compressed to allow the apertures of the rod to receive the prongs within it. The spring tension rod is released allowing the spring tension of the rod to maintain itself onto the hooks as per FIG. 2b.

For larger windows that require additional brackets, two e-shaped hooks are slid onto the brackets with the prongs pointing in opposite directions as per FIG. 3a and FIG. 3b.

CONCLUSION, RAMIFICATIONS, AND SCOPE

Accordingly, the reader will see that the Hang-It-All Curtain System is a simpler and more cost effective way to hang multiple layers of curtaining. The use of the e-shaped hook allows for easy installation without the need for screws or clamps. The shape of the hook by a continuous wire creates a more secure way to hang the supplemental rod reducing the risk of breakage through t. When used with the spring tension rod, the spring tension holds the rod in place on the hook further reducing the risk of the curtains falling. This system also greatly increases the ease of removing and rehanging curtains. This is achieved by the compression of the spring tension rod allowing for this ease of use without having to take the hooks off the bracket.

What is claimed:

1. A system for hanging curtains comprising:
   a. two e-shaped hooks, each e-shaped hook comprising: a middle section that bends back 180 degrees to form an upper section, the upper section bending to form a downward arm running perpendicular to the upper and middle sections, the downward arm bending at a right angle to form a prong running parallel with the upper and middle sections;
   b. a telescoping rod device comprising a spring tension rod which is supported by the prongs of said e-shaped hooks;
   c. two brackets of a separate and independent curtain rod assembly which are each received between the middle and upper sections of one of the said e-shaped hooks; and
   whereby subsequent layers of curtaining to that of a main curtain assembly are hung on the brackets via the telescoping rod device and e-shaped hooks, without requiring the use of nails, screws, or other securing means.

2. The system for hanging curtains according to claim 1, wherein said middle and upper sections of said e-shaped hooks are each bent to correspond to a dimension of their respective bracket.

3. The system for hanging curtains according to claim 1, wherein said e-shaped hooks are made of a material that is able to maintain its shape and support the weight of standard curtaining material.

4. The system for hanging curtains according to claim 1, wherein said telescoping rod device is configured with one rod inserted into a second rod of a slightly larger dimension.

5. The system for hanging curtains according to claim 4, wherein an internal spring allows for measured adjustment of said telescoping rod.

6. The system for hanging curtains according to claim 4, wherein ends of said telescoping rod are hollow.

7. The system for hanging curtains according to claim 6, wherein the prongs of said e-shaped hooks are inserted into the hollow ends of the said telescoping rod.

* * * * *